March 19, 1935.  C. A. TURNER  1,994,970
FLUID FLOW INDICATOR
Original Filed Dec. 14, 1927  4 Sheets-Sheet 2

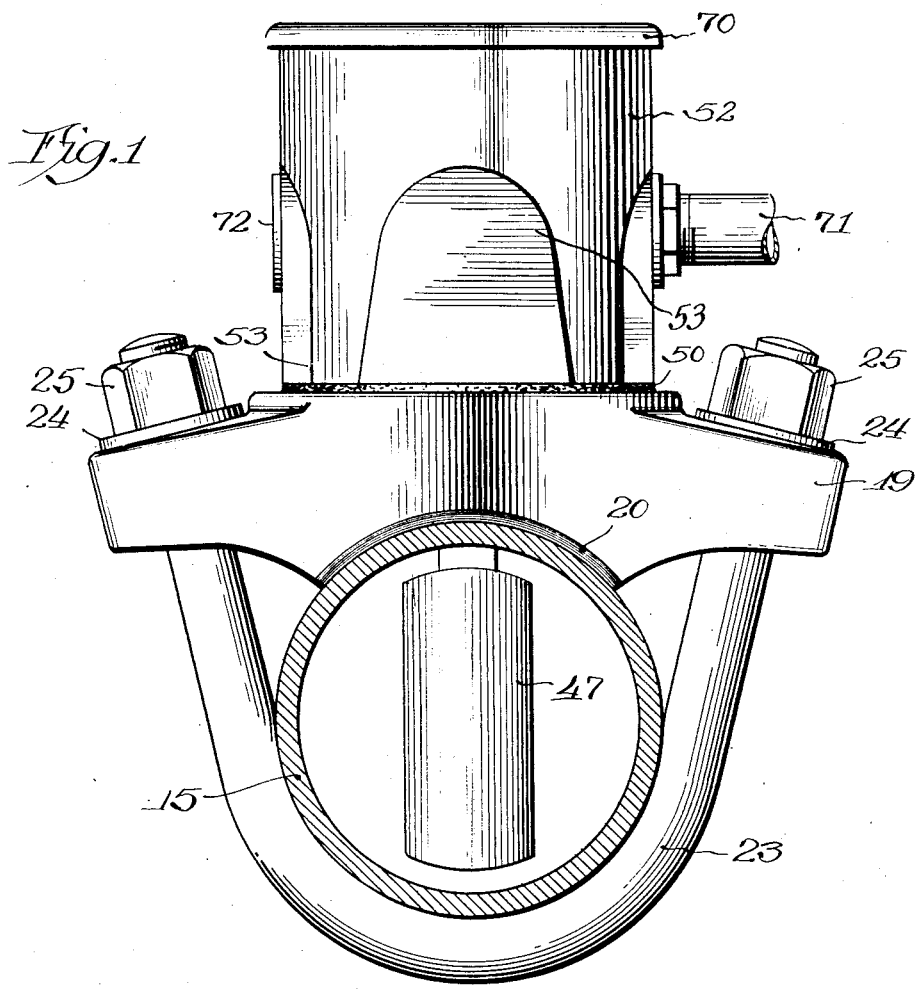
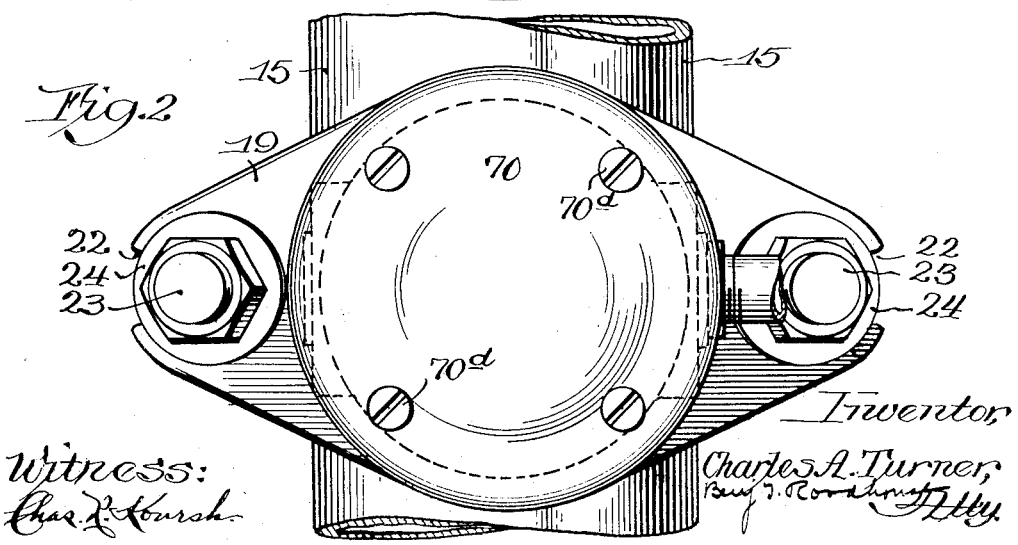

March 19, 1935.  C. A. TURNER  1,994,970
FLUID FLOW INDICATOR
Original Filed Dec. 14, 1927  4 Sheets-Sheet 3
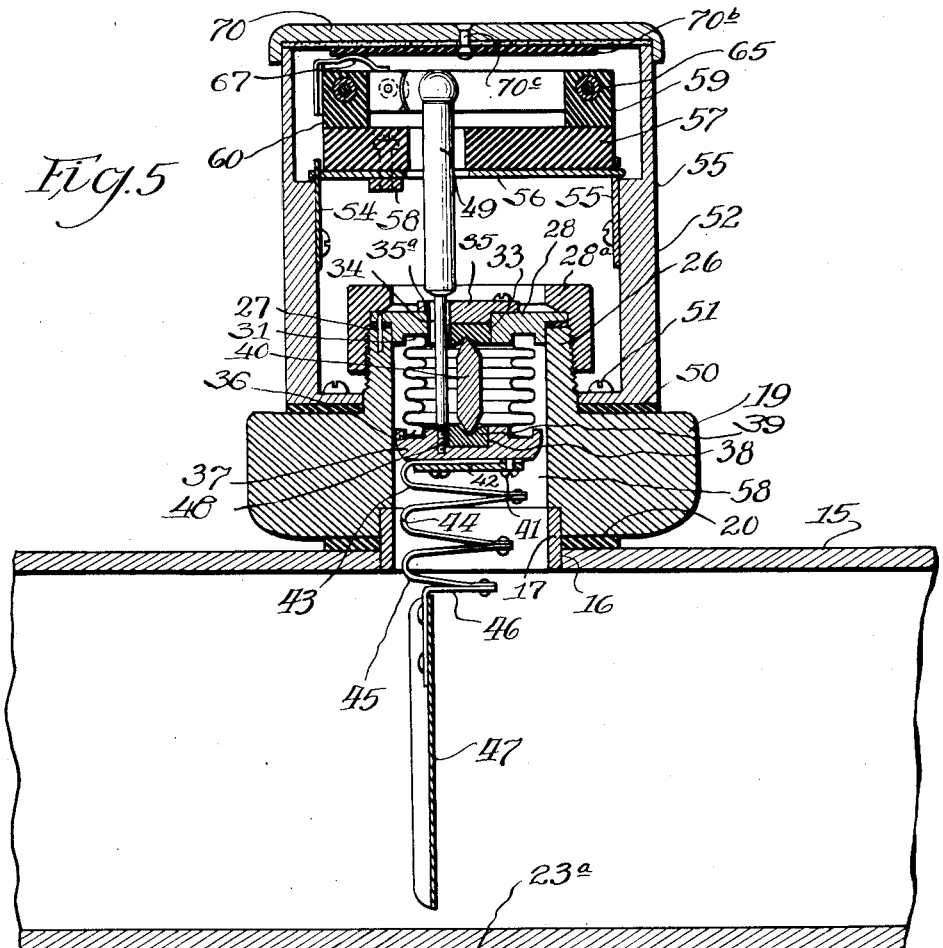
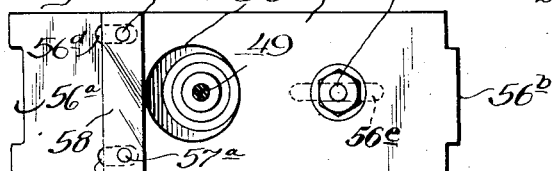
Inventor
Charles A. Turner,
By Benj. J. Roadhouse
Atty
Witness
Chas. R. Koursh.

March 19, 1935.  C. A. TURNER  1,994,970
FLUID FLOW INDICATOR
Original Filed Dec. 14, 1927   4 Sheets-Sheet 4
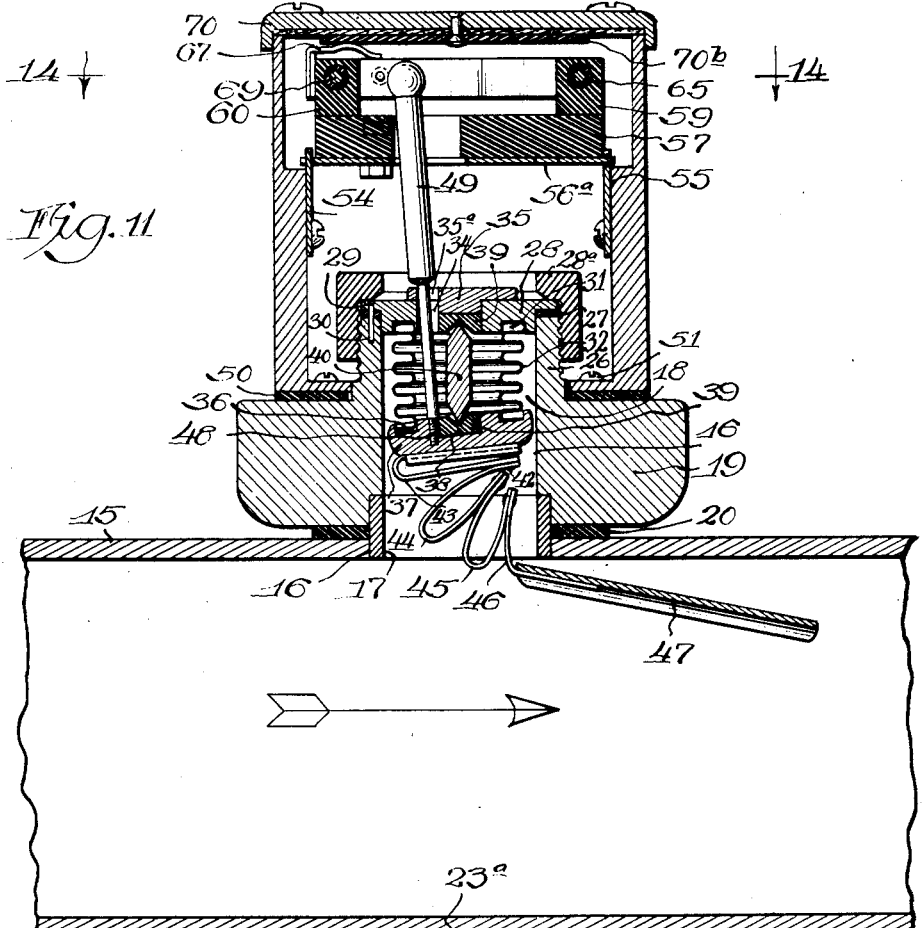
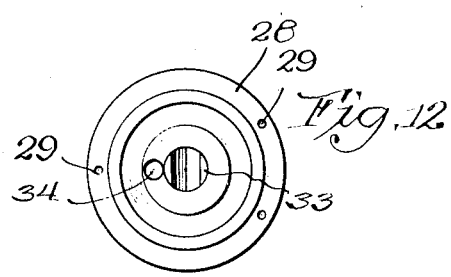
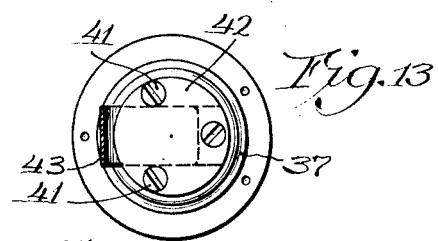
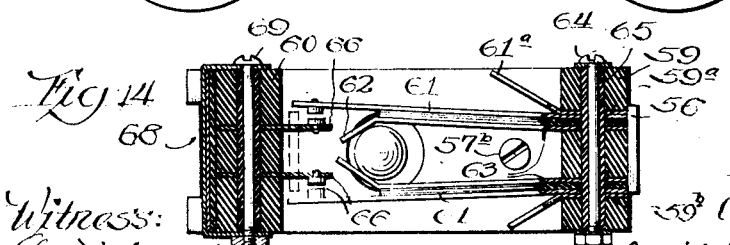
Witness:
Inventor,
Charles A. Turner, Patented Mar. 19, 1935

1,994,970

UNITED STATES PATENT OFFICE 1,994,970

FLUID FLOW INDICATOR

Charles A. Turner, Chicago, Ill., assignor, by mesne assignments, to Howe Manufacturing Company, Wilmington, Del., a corporation of Delaware Application December 14, 1927, Serial No. 239,936
Renewed June 21, 1934

22 Claims. (Cl. 200—81)

My present invention relates to the provision of a fluid flow indicator, and particularly a water flow indicator suitable for such a water distribution system as is employed in connection with sprinkler fire extinguisher installations.

As is readily appreciated, it is desirable to be advised when a flow starts in such a system, as it may mean either a fire or the occurrence of a leak or destruction of a sprinkler head through some other cause than fire, and a leak or flow from an open sprinkler head where there is no fire may cause considerable damage.

The water in such a system is an extremely mobile element and is responsive to changes of pressure and vibration so that there is always present in such systems movement backward and forward of the water, which, when sufficiently violent, creates the phenomenon of "water knock". The difficulty in devising a flow indicator for such a system has heretofore resided in the fact that an instrument which responded to the flow would respond equally well to the vibratory impulses to which such systems are incident upon any change of pressure.

It has therefore been my object to provide an instrumentality which could be depended upon to indicate a flow in the system, but which would not be responsive to movements occasioned merely by changes of pressure.

I have accomplished the foregoing object by means of the structure and arrangement of parts illustrated in the accompanying drawings in which—

Fig. 1 is an elevation of my apparatus shown in assembly with and attached to a branch main or lateral, the branch main or lateral being shown in section.

Fig. 2 is a top plan of the structure shown in Fig. 1.

Fig. 5 is a central section of the structure shown in Fig. 1 taken at right angles with that shown in Fig. 4.

Fig. 6 is a bottom plan of the plate carrying the contact element particularly showing how the contact element may be adjusted with relation to the plate.

Figs. 7 and 8 are details of the upper ends of the brackets with which the respective ends of the contact element plate or base engage.

Fig. 9 is a perspective of the double-end link or fulcrum extending between opposite ends of the sylphon.

Fig. 10 is a perspective detail of one of the blocks with which the ends of the link or fulcrum assemble.

Fig. 11 is a view similar to that shown in Fig. 5 with the blade deflected and the apparatus in position to interrupt the circuit.

Fig. 12 is a bottom plan of the upper sealing disk which carries the corrugated tube.

Fig. 13 is a bottom view of the bottom disk closing the lower end of the corrugated tube and showing the relation of the spring carried pendantly thereby, and Fig. 14 is a section on line 14—14 of Fig. 11 showing the contact broken.

The flow in the system which I desire to supervise is from the source of supply through the branch main or laterals to the sprinkler heads in one direction only, as the draining of the system through the mains is a supervised operation and there are many incidents of such an operation which make itself readily known. The flow, therefore, which I wish to detect is always in the direction of the arrow, as shown in Fig. 11.

Water is practically incompressible and no volume of air is trapped in the system, the compression of which will permit of a flow in one direction except momentarily. Therefore, when a change of pressure occurs the water surges backwards and forwards and does not set up a continuous flow in one direction except momentarily. In fact, the water hammer results from the stoppage of such momentary movement and the stoppage creates a slight reverberatory or backward action.

I have, therefore, designed my apparatus so that the portion thereof which receives the impulse from the moving water must be deflected a certain predetermined extent and maintained in a deflected position for an appreciable length of time, which may also be predetermined, before a second less freely moving portion of the apparatus functions to operate the signals with which it is combined.

Figure 4:
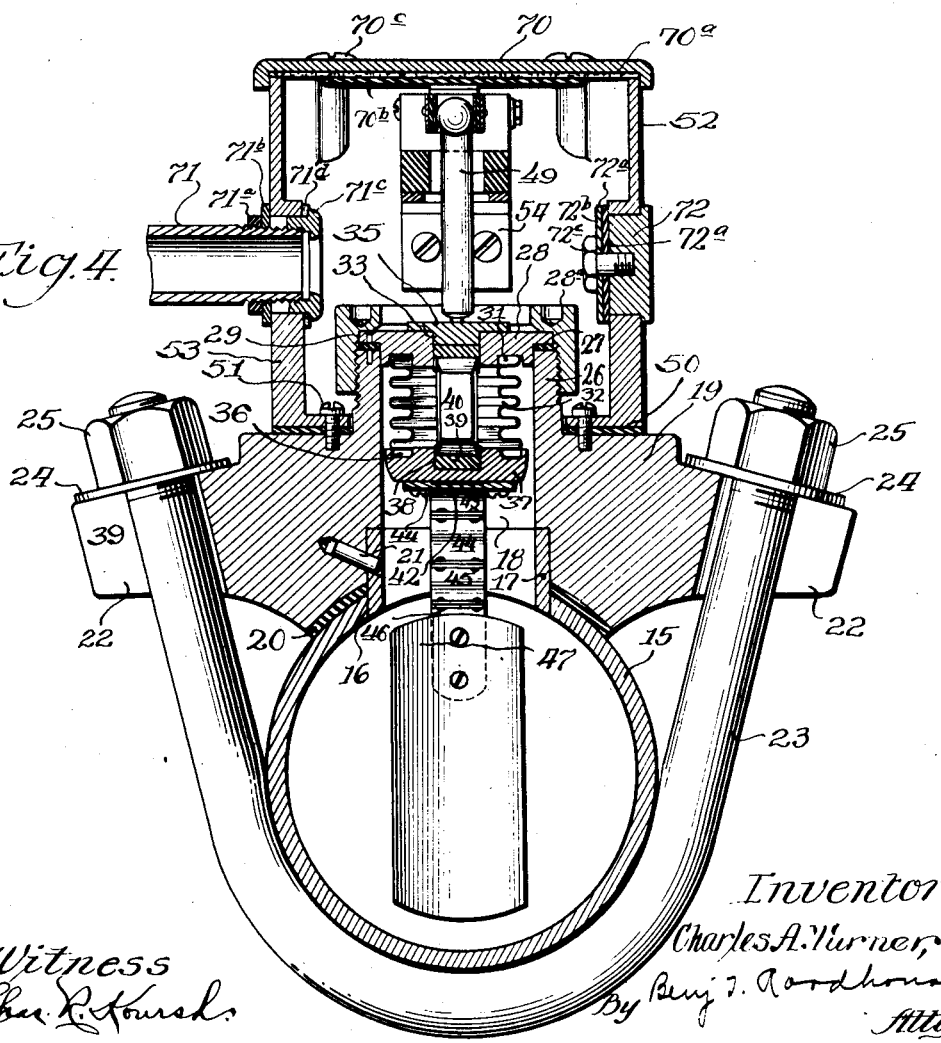
Fig. 4 is a central vertical section of the structure shown in Fig. 1, the section being taken transverse of the lateral.

A horizontal portion of a branch main or lateral, 15, is bored, as at 16, as shown in Figs. 4 and 5, to receive a nipple or stub pipe, 17, extending from a central bore, 18, in a saddle or yoke, 19, which rests upon a gasket, 20, interposed between the saddle and the pipe or main, 15. The stub or nipple, 17, is preferably pinned to the saddle or yoke so as to prevent relative displacement of these parts by means of the pin, 21, as shown in Fig. 4. The saddle or yoke, 19, is laterally extended and the extended ends are provided with the recesses, 22, through which pass the threaded ends of a bow, 23, extending about the branch main or lateral, 15. Washers, 24, and nuts, 25, are provided to draw the bow snugly about the lateral. The portion of the bow which comes in contact with the branch main or lateral is flattened, as shown at 23a in Fig. 5, so as to increase the bearing surface between these elements and distribute the pressure. To increase the length of the central recess, 18, in the saddle or yoke, 19, there is a central exteriorly threaded hollow embossment, 26, arising from its upper surface. The bore in the embossment, 26, continues the bore, 18, in the saddle or yoke, 19, and on the upper edge of the embossment, 26, is seated a gasket, 27, upon which rests an outer reduced edge or flange of a centrally thickened disk, 28. The disk, 28, is held to the embossment, 26, by the interiorly threaded flanged collar, 28a, so that when the collar, 28a, is removed, the disk, 28, and all the parts attached thereto may be withdrawn as a single unit, which greatly facilitates inspection, replacement and repair. This disk, 28, is oriented with relation to the embossment by means of unsymmetrically placed recesses, 29, in the outer reduced edge or flange which receives pins, 30, fixed in the embossment and extending up through the gasket, 27, into the recesses, 29. In the thickened portion of the disk, 28, is provided an annular channel, 31, into which channel is soldered, or swetted, or otherwise secured and sealed a length of thin circumferentially corrugated tubing, 32. Such tubing is formed from copper, or brass, or bronze, or other suitable metal having a sufficient degree of flexibility and elasticity and is generally known as a "sylphon". The disk, 28, is provided with a central bore, 33, and an eccentric bore, 34, the central bore being closed by cap plate, 35, the central portion of which is provided with an embossment which enters a short distance into the central bore, 33. The cap plate, 35, has a bore, 35a, which registers with bore, 34, in the disk, 28. The lower end of the corrugated tube, 32, is likewise sealed in an annular channel, 36, in a disk, 37, having an upwardly opening central recess, 38. In the lower portion of the bore, 33, and the recess, 38, so as to have free rotative movement are circular blocks, 39, clearly shown in Fig. 10, having a V shaped recess or depression in their outer faces. To prevent the corrugated tube, 32, from being compressed longitudinally and at the same time to permit the lower disk, 37, which is unattached except to the lower end of the tube, 32, to have slight bodily and also oscillatory movement in one direction, by reason of the flexibility of the corrugated tube, I provide the fulcrum or link, 40, clearly shown in Fig. 9, the V shaped ends of which enter the V shaped recesses in the blocks, 39.

To the bottom of the disk, 37, is secured by screws, 41, a disk, 42, between which and the bottom of the disk, 37, is secured one arm or blade of a U shaped spring, 43, to the unattached end of which is riveted or otherwise secured a like but slightly shorter U shaped spring, 44, to the unattached end of which is riveted or otherwise secured a third still shorter U shaped spring, 45, to the unattached end of which is riveted, or otherwise secured, a right angle bracket, 46, and to the downward extending arm of the right angle bracket, 46, is riveted, or otherwise secured, a vane or blade, 47, which extends into the bore of the branch main or lateral, 15, and is slightly concaved toward the direction from which the flow to be detected is expected.

The particular spring suspension above described secures several desirable objects. In the first place, the provision of a spring in three portions of decreasing length permits the spring to fold up entirely within the cavity, 18, when the blade or vane, 47, is displaced by the flow so as to assume a position more or less parallel with the axis of the branch main or lateral, 15. Again, the increased bending of the rounded portions of the springs, 43, 44 and 45, is limited and can be depended upon not to bend the springs beyond their limit of elasticity so that the blade or vane, when the flow ceases, will resume its normal position, illustrated in Figure 5. The use of the plurality of springs serves to provide an elongated resilient connection between the vane and the actuating rod, so that sensitivity of response is provided, and so that no portion of the spring linkage will be stressed beyond its elastic limit. The spring arrangement disclosed also enables the vane 47 to swing in a reverse direction, i. e., to the left from the normal position shown in Figure 5, so that reversing surges of water in conduit 15 will not injure the construction.

A still further reason for making the spring suspension of the blade or spoon, as above described, is that it will permit the use of a less elastic metal such as a precious metal or an alloy which will not be subject to corrosive action.

It will be seen from the foregoing description that the blade or spoon, 47, may vibrate readily and its movement or displacement will have to be transmitted through the springs 43, 44 and 45 before it will exert any deflecting force upon the disk, 37. It will also be seen that the disk, 37, being suspended by the corrugated tube 32, has neither the latitude, freedom nor sensitiveness of movement of the springs so that in order to transmit from the blade or vane, 47, a deflecting effort upon the disk, 37, the deflection of the blade or spoon must be to a definite extent and in the same direction for an appreciable length of time. The extent of deflection time necessary for the communication of such a displacing force from the vane, 47, to the disk, 37, can be controlled by the lengths of the springs, 43, 44 and 45, as well as by the selection of the metal from which they are made and their thickness and width.

There are also other instrumentalities hereinafter to be described for controlling the extent and length of time a displacing impulse must be active upon the blade or vane, 47, before the apparatus will signal the occurrence of such displacement.

Adjacent the central recess, 38, of the disk, 37, the disk is provided from its upper surface with a tapped recess, 48, into which screws the threaded end of a rod, 49, which extends with some play through the bore, 34, in the disk, 28, and the registering bore, 35a, in the cap plate, 35. The rod, 49, is enlarged above the cap plate, 35, so as to prevent the corrugations in the tube, 32, from being drawn out or extended too far in handling or installation and the top of the rod, 49, is given a ball form for a purpose hereinafter to be described.

Seating about the hollow embossment, 26, upon the upper face of the saddle or yoke, 19, is a gasket, 50, and held down upon this gasket by screws, 51, extending through its inturned lower edge is a cylindrical casing, 52. Extending upwardly from the bottom of this casing for a distance somewhat above one-half its height are developments or abutments, 53, on four opposite sides which thicken the walls of the casing at those places and provide flat areas both interiorly and exteriorly thereof. Upon the interior faces of the abutments extending transverse of the axis of the branch main or lateral, 15, are secured the plates or brackets, 54 and 55, the upper ends of which are shown in detail in Figs. 7 and 8. The upper end of the plate or bracket, 54, is provided with a tongue, 54a, and the upper end of the plate or bracket, 55, is provided with a transverse slot, 55a.

I further provide a plate, 56, shown in detail in Fig. 6, upon one end of which is a recess, 56a, to receive the tongue, 54a, and on the other end of which is a tongue, 56b, to enter the slot 55a. The plate, 56, is further provided with an opening, 56c, through which the rod, 49, extends, and also screw openings, 56d—56d and 56e. To the top of the plate, 56, is secured an insulating block, 57, by means of countersunk screws, 57a and 57b. The screws 57a pass through elongated opening, 56e, in the block and are secured in a plate, 58, located below the plate, 56. By loosening the screws 57a and screw 57b, the insulating block, 57, may be adjusted so as to further influence the extent and time of deflection of the blade or spoon, 47, before a signal will be given. Secured upon both ends of the insulating block, 57, are transverse insulating blocks, 59 and 60. The transverse insulating block, 59, is cut down from its upper surface about two-thirds of its thickness to provide slots 59a and 59b into each of which slots are forced the ends of spring contacts 61, and connecting ears, 61a, respectively, the inner ends of which within the slot are in contact. The spring contact blades, 61, extend from the blocks, 59, to adjacent the blocks, 60. Also forced into the slots, 59a and 59b, are spring blades, 62, having their unattached ends bent toward each other, and flexible insulating blades, 63, which separate the spring blades, 62, from the spring contact blades, 61, electrically. A bolt, 64, with an insulating bushing, 65, passing through the block, 59, secures this assembly together. The block, 60, is also transversely slotted to receive contact blades, 66, which co-operate respectively with spring contact blades, 61. The blades, 66—66, have no electrical connection except through a metal spring, 67, carried by a U shaped resilient strap, 68, the ends of which are secured to opposite ends of block 60 by means of a bolt, 69, similar in all respects to the bolt 64. The spring 67 is depressed by the cover when it is in place so that the cover cannot be removed without breaking the circuit.

It will be seen that the entire electrical element may be disengaged from the brackets 54 and 55 and removed without disturbing any other portions of the mechanism. It is the usual practice to provide an excess of conductors from the cable to the point where attachment is made and when this is done the connection between the ears 61a and the conductors may be made while the electrical element is out of the casing for accessibility and when it is replaced the excess conductors are coiled or otherwise conveniently stowed within the casing in such a manner as not to interfere with the rod 49 or the blades of the switch.

Figure 3:
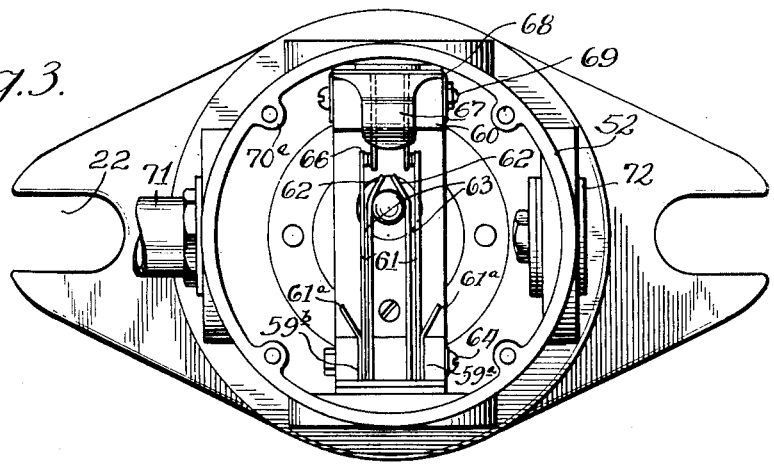
Fig. 3 is a view similar to that shown in Fig. 2 except the cover has been removed so as to disclose the electrical arrangements.

It will be understood from an examination particularly of Figs. 3, 4 and 5 that the ball headed upper end of the rod 49 extends between the spring blades 62 and when the disk 37 has been deflected sufficiently far the ball will be forced between the inturned ends of the spring blades 62, thereby forcing them apart and also through the insulating blades 63 forcing apart the spring contact blades 61, thereby breaking their contact with blades 66.

The upper end of the casing 52 is closed by a disk 70 having a down turned or flanged edge which extends around the upper edges of the sides of the casing. Inside of the cover is a sealing gasket 70a, which extends between the cover 70 and the upper edges of the casing, and inside of the sealing gasket is a plate of insulating material 70b secured to the closure by means of the headed screw 70c. The insulating plate 70b contacts and depresses the spring 67 against the tops of the blades 66—66, thereby completing the circuit between these blades, and the plate 70b also assists in holding the sealing gasket 70a in position.

The two abutments 53 which are lateral to the abutments which support the plates or brackets 54 and 55 are bored for the admission of the conduit which contains the cable containing the conductors for attachment to the ears 61a. The conduit, 71, is provided with a lock nut 71a and washer 71b on the outside and upon the inside with a bushing 71c having a head extending both outwardly and inwardly whereby a sealing gasket 71d may be installed between the outwardly extending portion of the bushing and the inner face of the abutment 53.

The top 70 is secured in the assembly just described by means of screws 70d which pass down through the cover 70 and sealing gasket 70a into bored and tapped inturned lateral ears 70e provided at suitable intervals upon the upper edge of the casing.

There is usually occasion to employ but one conduit and cable, but in order to facilitate the installation of this conduit from either side I have bored both of these opposite abutments and the one not used for the installation of the conduit is closed by a headed plug 72, which is held in place from the inside by a sealing gasket 72a, washer 72b and machine screw 72c, which extends through the washer and sealing gasket and into a tapped depression in the plug, 72.

Having described my invention what I claim as new and desire to secure by Letters Patent is:

1. A flow indicator comprising a blade immersed in the element in which the flow is to be detected, a plurality of U shaped springs, the arms whereof are joined suspending said blade, a pivotally and laterally movable element to which said spring suspending assembly is attached, a rod fixed to and extending at right angles from said last mentioned element and a circuit opening and closing element in co-active relation with said rod.

2. A flow indicator comprising an element having two compartments, said compartments being separated by a disk, a circumferentially corrugated tube mounted in said disk and a head for closing the other end of said tube, rotatable slotted elements carried on the inner face of said disk and head, a link extending between and co-operating with the slots in said elements, a rod secured in said head and passing through said disk, a circuit opening and closing element in co-active relation with the end of said rod, a spring secured to and carried externally by said head and a plate carried by said spring in the element subject to flow.

3. In a flow indicator a centrally bored saddle or yoke having laterally extended slotted ends, a bow, the arms whereof extend through said slots and are provided with means for clamping said yoke and bow to a pipe, a disk seated over the bore of said yoke, and means for securing the same in position, a circumferentially corrugated tube carried by said disk and extending into the bore in said yoke, a head closing the other end of said tube, a strut or fulcrum extending between said disk and head and having pivotal and rotative movement with respect to said elements, a rod fixedly secured in said head and extending loosely through said disk, a circuit opening and closing element mounted in co-active relation with said rod, a plurality of U shaped spring elements riveted together in series secured to the outer face of said head and a blade carried by said spring assembly subject to the action of the medium subject to flow.

4. In a flow indicator, a centrally bored yoke, a bow co-operating therewith for securing said yoke to a pipe, means for closing the bore in said yoke, including a circumferentially corrugated tube of flexible material having its unsecured end closed, means for preventing the collapsing and permitting the flexing of said tube and the rocking of its closed end, circuit opening and closing elements, means carried by and on one side of the closed end of said tube extending into co-active relation with said circuit opening and closing elements, a blade and an elastic element extending between and securing said blade to the other side of the closed end of said tube.

5. A flow indicator having a compartment opening into the compartment where flow occurs, a blade within said last mentioned compartment, and a spring having U-shaped segments supporting said blade extending from within said indicator compartment and adapted to fold therein upon the deflection of said blade.

6. In a flow indicator comprising a deflectable element, means for restricting the movement of said element, a second deflectable element secured to said first mentioned element, a plate carried by said last mentioned element subject to flow, a circuit opening and closing device comprising a pair of spring blades secured at one end and having their opposite ends inclined towards each other, and additional spring blades mounted exteriorly of and adjacent each of said pair of blades and insulated therefrom, oppositely extending blades extending interiorly of and contacting said last mentioned blades when in normal position and a rod carried by said first mentioned deflectable element and extending between said blades with inturned ends whereby upon the deflection of said element said contact blades are separated and the circuit is broken.

7. In a flow indicator comprising deflectable elements of different sensitivity one carried by the other, a blade carried by the element of greatest sensitiveness, a circuit opening and closing element comprising spaced contact blades, interior oppositely extending contact blades contacting said first mentioned blades, and means carried by the element of least sensitivity extending into co-active relation with said first mentioned contact blades and operable to spread the same upon the deflection of said element.

8. In a flow indicator a deflectable element exposed to the elements subject to flow, a circuit opening and closing device comprising a pair of elastic spaced blades, a pair of oppositely extending blades contacting said first mentioned blades when in normal position, means operable by the deflectable element for separating one pair of said blades from the other, a casing surrounding said circuit opening and closing element, a closure for said casing and a spring depressed by said closure when in closed position to bridge and electrically connect a pair of said blades whereby the circuit is open when said closure is out of closed position.

9. A flow indicator comprising a resilient deflectable element, means for restricting the movement of said element, a deflectable element of relatively greater resilience than said first mentioned element carried by said first mentioned element, a plate carried by said last mentioned element subject to the action of the element subject to flow, a circuit opening and closing device and means carried by said element of less resilience extending into co-active relation with said circuit opening and closing device.

10. A flow indicator comprising a deflectable element consisting of a flexible tube and means for preventing the longitudinal collapsing thereof, a second deflectable element consisting of a spring of undulatory, longitudinal form, a plate carried by said spring subject to the action of the element the flow of which is to be supervised, a circuit opening and closing device and means carried by said tube extending into co-operative relation with said circuit opening and closing device.

11. In a flow indicator a deflectable element exposed to the element in which flow is to be detected, a circuit opening and closing device comprising a pair of fixed contacts, spring means co-operating with said fixed contacts and moved by said deflectable element to break contact between said spring element and one or both of said fixed contacts, a casing surrounding said elements, a closure for said casing, and means operated by said closure for supplying electrical connection between said fixed contacts.

12. A flow indicator comprising a deflectable element consisting of a chamber with flexible walls and means pivotally connected with the ends of said chamber for axially spacing said ends, a spring mounted upon the end of said chamber and a transversely curved blade carried by said spring, a circuit opening and closing device and means moved by the deflectable element extending into co-operative relation with said circuit opening and closing device.

13. In a flow indicating device of the class described, comprising a housing having a central bore, circuit controlling mechanism carried by said housing, flexible sealing means secured at one end to the upper end of said bore and depending therefrom downwardly in said bore, a closure member sealing the free end of said sealing means, a flow-responsive member supported by and depending from said closure member, and actuating means for circuit controlling mechanism supported solely at the lower end of said sealing means and extending freely upwardly through said sealing means and said bore to actuate said circuit controlling mechanism upon movement of said flow-responsive member.

14. An actuating mechanism for a flow-indicating device, comprising a housing having a bore therein, a flow-responsive member, a flexible substantially tubular sealing member secured in depending position within said bore and having a rigid closure member at its lower end, means for securing said flow-responsive member in depending position to said closure member, and a circuit controlling actuating rod having rigid support at its lower end in said closure member and projecting freely upwardly within said sealing means to engage circuit control means at its upper end.

15. A fluid flow-indicating device including a housing having an annular bore, a flexible substantially tubular sealing member secured to said bore and extending therethrough, a flow-responsive means, means closing the extending end of said sealing member and supporting said flow-responsive member thereon, and a switch actuating member extending into said bore within said sealing member, said closure means supporting said actuating member within said sealing member.

16. In a flow indicating device, a housing, circuit-controlling mechanism carried by said housing, a bore in said housing, sealing means secured at one end to said bore, said sealing means defining a sealed passage within said bore opening toward said switch mechanism, flow-responsive means supported at the opposite end of said sealing means, and actuating means responsive to movement of said flow-responsive means and extending through said passage for actuating said circuit-controlling mechanism.

17. In a device for indicating flow of fluid through a conduit, the combination of a housing connected with said conduit, a flexible substantially tubular sealing member, means mounting one end of said tubular member substantially against movement within said housing, the other end of said tubular member being capable of sidewise flexing movement relatively to said fixed end, electrical contacts responsive to the sidewise flexing motion of said movable end, and a flow-responsive member within said conduit supported solely on the movable end of said tubular member, whereby movement of said flow responsive member resulting from flow of fluid through said conduit causes the movable end of said tubular sealing member to flex sidewise in the same direction as said flow responsive member is caused to move.

18. In a device for indicating flow of fluid through a conduit, the combination of a housing connected with said conduit, a flexible substantially tubular sealing member, means mounting the outer end of said tubular member substantially against movement within said housing, the inner end of said tubular member being capable of movement relatively to said outer end, electrical contacts responsive to motion of the inner end of said tubular member, a flow-responsive member within said conduit, and means connecting said flow-responsive member with the inner end of said tubular member serving to support said flow-responsive member solely on said tubular member and causing the inner end of said tubular member to swing directly with said flow-responsive member in the same direction as the fluid flow in said conduit.

19. In a device for indicating flow of fluid through a conduit, the combination of a housing connected with said conduit, a flexible substantially tubular sealing member, means mounting one end of said tubular member substantially against movement within said housing, the other end of said tubular member being capable of sidewise flexing movement relatively to said fixed end, electrical contacts responsive to the sidewise flexing motion of the movable end of said tubular member, a flow-responsive member having a normal position in said conduit substantially at right angles to the line of flow therethrough, and mechanism connecting said flow-responsive member with the movable end of said tubular member enabling said flow-responsive member to swing in said conduit in either direction from its normal position, whereby to enable said flow responsive member to yield in either direction to reversing surges of flow.

20. In a device for indicating flow of fluid through a conduit, the combination of a housing connected with said conduit, a flexible substantially tubular sealing member, means mounting the outer end of said tubular member substantially against movement within said housing, the inner end of said tubular member being capable of movement relatively to said outer end, a rod anchored to the inner end of said tubular member to swing therewith, means for confining movement of said tubular member and said rod to a plane substantially parallel to the length of said conduit, electrical contacts responsive to motion of said rod, a flow-responsive vane having a normal position in said conduit, and mechanism connecting said vane with the inner end of said tubular member serving to support said vane solely on said tubular member and including spring means enabling said vane to swing in said conduit in either direction from its normal position and to a limited extent relatively to the inner end of said tubular member.

21. In a device for indicating flow of fluid through a conduit, the combination of a housing connected with said conduit, a flexible hollow sealing member having one end secured in fixed position in said housing and extending in a direction substantially normal to the axis of said conduit, flow responsive means in said conduit engaging the other end of said sealing member, and electrical contact means in said housing actuated by movement of said sealing member, said flow responsive member flexing said sealing member in the direction of flow through said conduit.

22. In a device for indicating flow of fluid through a conduit, the combination of a housing connected with said conduit, a flexible substantially tubular sealing member having one end secured in fixed position in said housing and extending in a direction substantially at right angles to the axis of said conduit, the other end of said sealing member being capable of sidewise flexing movement relatively to said fixed end, said housing comprising a chamber isolated from said conduit by said sealing member, electrical contact means in said chamber, means responsive to the sidewise flexing motion of the movable end of said sealing member for actuating said contact means, and a flow responsive member within said conduit connected with the movable end of said sealing member whereby the movable end of said sealing member is flexed in the direction of flow through said conduit.

CHARLES A. TURNER.